United States Patent [19]

Lümen

[11] Patent Number: 5,613,898
[45] Date of Patent: Mar. 25, 1997

[54] DEVICE FOR PRODUCING INCLINED SURFACES AND GROOVES ON FRICTION PADS

[75] Inventor: Reinhard Lümen, Wiener Neustadt, Austria

[73] Assignee: Leinweber Maschinen GmbH & Co. KG, Wiener Neustadt, Austria

[21] Appl. No.: 432,779

[22] Filed: May 2, 1995

[51] Int. Cl.⁶ ..................... B24B 7/10
[52] U.S. Cl. ............... 451/190; 451/194; 451/232; 451/261; 451/279; 451/387
[58] Field of Search ............... 451/63, 182, 190, 451/194, 232, 260, 261, 262, 279, 387

[56] References Cited

U.S. PATENT DOCUMENTS

| | | | |
|---|---|---|---|
| 634,225 | 10/1899 | Wilson | 451/387 X |
| 1,220,287 | 3/1917 | Styll et al. | 451/387 X |
| 2,194,757 | 3/1940 | Klaas et al. | 451/190 X |
| 3,224,022 | 12/1965 | Kehr | 451/194 X |
| 4,060,937 | 12/1977 | Glazer | 451/190 |
| 4,375,141 | 3/1983 | Gaetano | 451/190 X |
| 4,672,775 | 6/1987 | Kummer | 451/182 X |

FOREIGN PATENT DOCUMENTS

| | | | |
|---|---|---|---|
| 627947 | 10/1978 | U.S.S.R. | 451/232 |

*Primary Examiner*—Timothy V. Eley
*Attorney, Agent, or Firm*—Herbert L. Lerner; Laurence A. Greenberg; Werner H. Stemer

[57] ABSTRACT

A device for producing inclines and/or grooves on friction pads, such as brake pads for motor vehicles comprises a table with a mount for the brake pads. The table is linearly moved on a carriage below flat, truncated-conical grind disks which are disposed in pairs and oriented mutually mirror-symmetrical. The table is swivellable about an axis oriented tranversely to the travel direction. The swivel movement is effected by at least one pneumatic cylinder. Control valves or control switches run onto cam ramps on cam bars when the table is driven forward and they initiate the swivel operation of the table. The friction pad is operated on when the table is in the downwardly or upwardly pivoted position, whereby the table is preferably locked in its position during the various grinding operations.

14 Claims, 4 Drawing Sheets

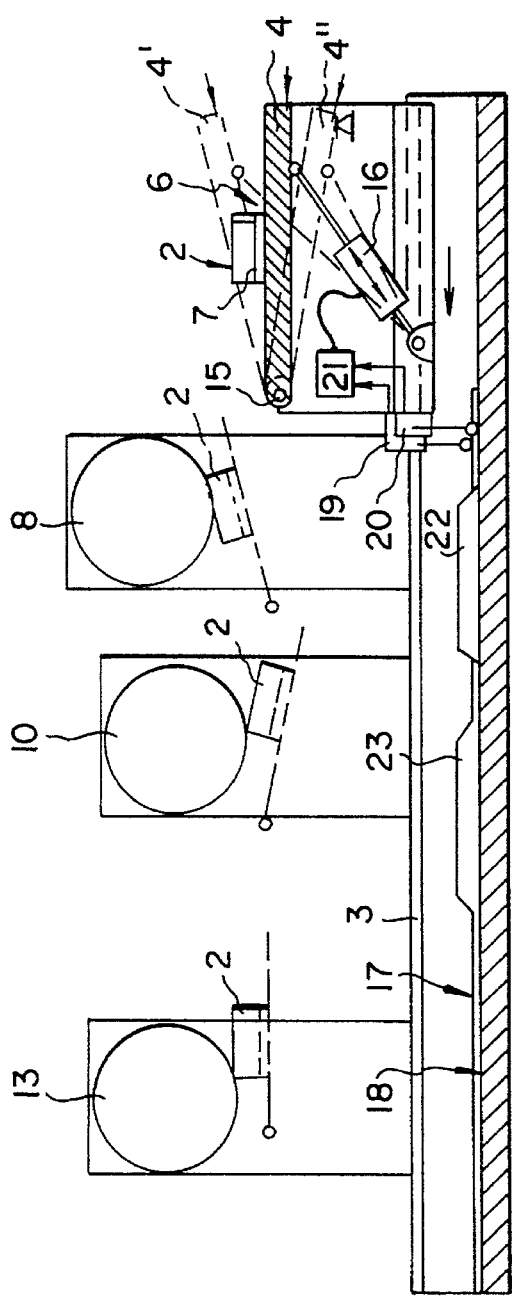
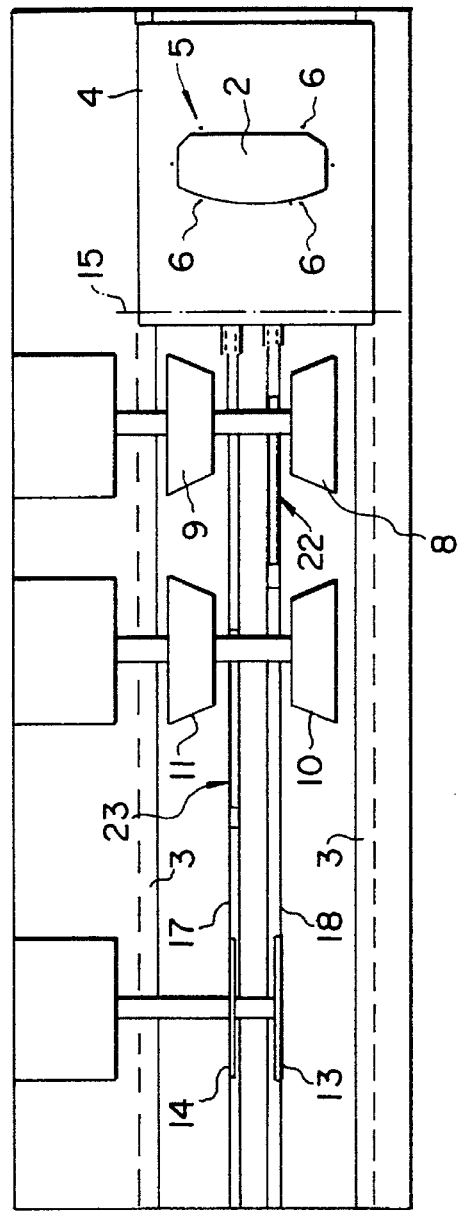

DEVICE FOR PRODUCING INCLINED SURFACES AND GROOVES ON FRICTION PADS

BACKGROUND OF THE INVENTION

1. Field of the Invention

The invention relates to an apparatus for producing inclined marginal surfaces and/or grooves on friction pads for motor vehicles by means of grinding disks, whereby the brake pads are laid onto a table and positioned in a mount.

2. Description of the Related Art

Grinding machines and processing centers are known in which any type of processing is possible through fully automatic, individually programmable controls. Those apparatus, such as CNC and CAM processors, are provided with multi-axis tool carriages with x, y, and z, as well as A, B, and C axes for shifting and rotating the tool, so that any position can be attained for the workpiece when the workpiece is variable with regard to those axis orientations. A multiplicity of actuation motors, position transducers and the like cooperate with the electronic control, so that a broad application spectrum results for those machines.

Furthermore, simple plan grinding disks have been known heretofore which, for instance, are used for surface processing and which can essentially perform one operation only.

The art of surface preparation in automotive friction pads has heretofore not provided a simple and economical apparatus with which it is possible to grind such friction pads to the exact specification within the permissible tolerances in an integrated processing step.

SUMMARY OF THE INVENTION

It is accordingly an object of the invention to provide an apparatus for producing inclined surfaces and/or grooves on friction pads such as brake pads, which overcomes the above-mentioned disadvantages of the heretofore-known devices and methods of this general type and which is distinguished in simple, compact construction with low error rating and maximum flexibility within the narrow application thereof in the processing of friction pads, i.e. brake pads.

With the foregoing and other objects in view there is provided, in accordance with the invention, an apparatus for a very specific application, namely an apparatus for producing inclined surfaces and/or grooves on automotive friction pads, comprising:

- a carriage table having a table surface supporting friction pads and being driveable in a given direction along a travel path;
- grind disks for grinding inclined surfaces on the friction pads disposed along the travel path;
- the table surface being swivellable about at least one axis to selectively assume a plurality of operational positions. The operational positions are generally defined as horizontal, upwardly inclined, and downwardly inclined, relative to the travel direction.

In accordance with an added feature of the invention, the table surface is swivellable about an axis extending transversely to the given direction.

In accordance with an additional feature of the invention, the friction pads have a given length, the grind disks are trucated conical grind disks and the grind disks are disposed in pairs and mirror-symmetrically relative to the travel path, the pairs of grind disks defining a spacing therebetween in the given direction approximately corresponding to the length of the friction pads.

In accordance with another feature of the invention, the pairs of grind disks are height-adjustably disposed relative to the carriage table, and the mutual spacing thereof is adjustable as well, as defined by the width of the friction pads and the distance between the grinding surfaces.

In accordance with a further feature of the invention, the apparatus includes further grind disks disposed along the travel path for grinding longitudinal grooves into the friction pads.

In accordance with again an added feature of the invention, the apparatus includes adjustable stops disposed on the carriage table limiting a pivot angle of the table surface from a horizontal position upwardly and downwardly.

In accordance with again an additional feature of the invention, the truncated conical grind disks are disposed in first and second pairs mirror-symmetrically relative to the travel path and behind one another along the forward travel path, the carriage table including a control for lifting the table surface from a horizontal position into an operating position of the first pair of grind disks, and for lowering the table surface from the horizontal position into an operating position of the second grind disk pair.

In accordance with again another feature of the invention, the apparatus further comprises stationary cam bars disposed along the travel path of the carriage table and switches, i.e. cam switches, disposed on the carriage table and actuatable by the cam bars.

In accordance with again a further feature of the invention, the switches are valves and the carriage table includes at least one fluidically (pneumatically, hydraulically) actuated lifting cylinder operatively connected with the valves.

In accordance with yet an added feature of the invention, the apparatus further comprises two levers extending in the travel direction laterally of the table surface, the two levers each having a foot point being swivellable about a transverse axis relative to the travel direction, and ends opposite the foot points about which the table surface is pivotally articulated, the table being pivotable together with the levers and independently of the levers. Or the table surface is pivotable together with the levers in a Z-like manner.

In an alternative embodiment, the apparatus further comprises a frame supporting the table surface, the table being pivotable with the frame or in an opposite direction out of the frame and, if the frame is pivoted, the table is pivotable out of the frame in a Z-like manner.

As mentioned above, the table is lockable in the defined operational positions defined by stops.

In other words, the carriage table is movable linearly in the longitudinal direction relative to the friction pads and swivellable about at least one axis oriented preferably transversely to the travel direction. The upstream and downstream inclines at the brake pads can thereby be produced even roof-like in any arbitrary angle orientation and depth quickly and inexpensively. This is also true for grooves. It is useful to thereby provide frustoconical (truncated cone) grinding disks which are disposed mutually opposite one another in mirror orientation. These disks are adjustable in height and their spacing is adjustable. The mean distance between the grinding disk pairs corresponds approximately to the length of a brake pad. Stops may be provided for limiting the tilt angle of the table.

A specific embodiment is characterized in that several pairs of conical grind disks are disposed one behind the other along the travel direction and in that a lift control is provided for lifting the table from the horizontal orientation into the operating region of the first grinding disk pair(s) and for lowering the table from the horizontal position into the operating region of the second grinding disk pair(s). It is thereby suitable in such a control system to provide stationary switch bars (cam bars) along the travel path of the table and to provide switches on the table carriage which are actuatable by the switch bars, such as cam switches or valves for at least one hydraulic or pneumatic lifting cylinder.

An advantageous adjusting possibility of the angular position of the table results when the table is disposed between two levers which extend in the travel direction, whose foot points are swivellable about a transverse axis to the travel direction and on whose opposite end the table is pivotally articulated. The table may be pivoted together with the levers or, in the case of horizontal levers it can be pivoted from the horizontal plane or, in the case of inclinded levers it can be pivoted from the lever plane in Z-like fashion. The table can thus be pivoted in two directions in the manner of a lectern but it can also be parallel-shifted upwardly and downwardly. This is similarly possible in that the table is disposed in a frame and in that it is pivotable together with the frame, it is pivotable out of the frame in the opposite direction, or it is pivotable—in the case of a pivoted frame—out of the frame in a Z-like manner.

The apparatus can be disposed immediately following a circular press for producing brake pads or with the intermediary of a planar grinding machine.

Other features which are considered as characteristic for the invention are set forth in the appended claims.

Although the invention is illustrated and described herein as embodied in an apparatus for producing inclined surfaces and/or grooves on friction pads such as brake pads, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIG. 1 is a partly longitudinally sectional and diagrammatic side view of an apparatus for producing inclines and grooves on brake pads;

FIG. 3 is a top-plan view thereof;

DESCRIPTION OF THE PREFERRED EMBODIMENTS

Figure 2:
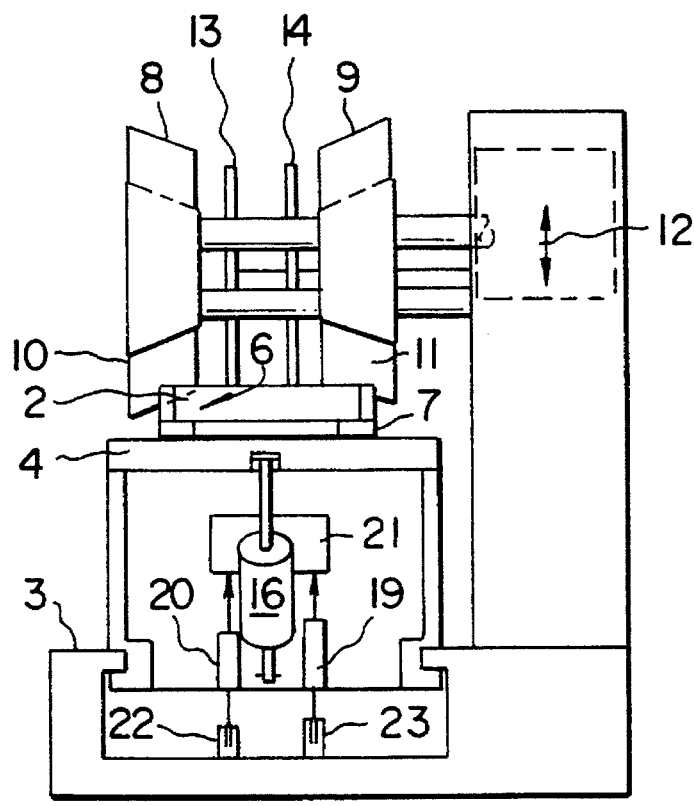
FIG. 2 is a front view thereof.

Referring now to the figures of the drawing in detail and first, particularly, to FIG. 1 thereof, there is seen an apparatus for producing inclined surfaces 1 and/or grooves on friction pads 2, i.e. brake pads 2. A carriage table 4 can be driven in a longitudinal direction along guide tracks 3. The forward driving of the table 4 can be effected in a conventional manner by way of a spindle drive (e.g. a ball bearing spindle drive), hydraulically or pneumatically. A mounting assembly 5 for the workpiece is disposed on the table 4. The workpiece in this case is the brake pad 2 which is to be processed. The mounting assembly 5 may be effected by positioning pins 6 and/or a switchable electromagnet in the table 4. The latter is useful when the brake pad is press-formed on a base plate 7 of metal.

The carriage table 4 is illustrated in its initial position in FIGS. 1, 2 and 3. Along its travel path there are disposed tools in the form of truncated-conical (frustum) grinding disks 8, 9 and 10, 11 which—in pairs on a common axis—face one another mirror-symmetrically. As shown in FIG. 2, these grind disks 8, 9 and 10, 11 can be adjusted in height (arrow 12). This is also true for the narrow grind disks 13, 14 which are provided for the optional formation of grooves (rain grooves) in the brake pads 2.

The table 4 illustrated in FIG. 1 is swivellable about an axis oriented transversely to its travel direction, i.e. an axis 15 which is oriented perpendicularly to the guides 3. A pneumatic cylinder 16 is provided below the table 4 and it can raise and lower the table 4. The pneumatic cylinder 16 may, of course, be replaced by any functional equivalent, such as an electrically actuated spindle drive, a solenoid actuator, a magnetic actuator, or the like. Cam bars 17, 18 are provided along the travel path. The lobes of the cam bars initiate the operation to raise or lower the table. Cam actuated switches 19, 20 may also be embodied directly as pneumatic valves. A control 21 is intermediately connected in FIGS. 1 and 2 by means of which the pivot angle of the table 4 can be adjusted relative to the travel direction, namely the horizontal.

The individual table positions (i.e. orientations), namely horizontal, upwardly into a predetermined terminal position and downwardly into a predetermined terminal position, can be pneumatically locked through the control 21. The terminal positions of the table are illustrated in FIG. 1 at 4' and 4" with dashed lines.

Figures 4, 5:
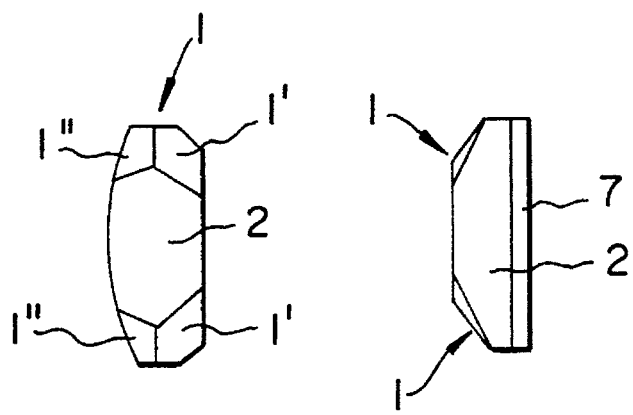
FIG. 4 is a top plan view of a finished product with inclines.
FIG. 5 is a side elevational view of the finished product.

The apparatus operates as follows: A brake pad 2—arriving for example from the press or from a planar grinding machine for removing the mold liner—is inserted into the mounting assembly 5 while the table 4 is in its horizontal position. The carriage table 4 starts to move forward, whereby the switch 20 is actuated by running onto a control ramp 22 of the cam bar 18. The control 21 activates the cylinder 16 and the table is lifted into the position 4'. The process is measured such that the conical surfaces of the grind disks 8, 9 attack the work piece, namely the brake pad 2, immediately following the instant when the table has reached and was locked in the table position 4'. The surfaces 1' (FIG. 4) are ground off.

When that grinding operation is finished, the switch 20 falls back into the original position and the table 4 is swivelled back into the horizontal position. As the switch 19 runs onto a control ramp 23, the table is immediately swivelled further downwardly into the position 4". The surfaces 1" are ground in that position 4".

When that grinding operation is finished, the switch 19 falls and the table 4 assumes its locked horizontal position; then the table is further driven forward and the grind disks 13, 14 come to act and grind in parallel grooves or recesses (not illustrated). These grooves can have increasing or decreasing depth, in that the table 4 is inclined downwardly or upwardly. Increasing groove depth with increasing distance of the braking surface from the center of rotation can have a positive effect on the lifetime of the brake pad. Non-illustrated pressdown elements are disposed between the grind disks 8, 9; 10, 11; 13, 14 which lie down centered onto the brake pads 2 so as to press them into the mount during the processing. This prevents the brake pads from being ripped from the mount during the grinding operation.

The position of the grind disks 8, 9, 10, 11, 13 and 14 is exactly adapted to the obliquely oriented workpiece, so that the desired grinding depth can be obtained. It is also possible to dispose two grind disks with the same effect in series if this is required by the grind depth or the surface quality.

The cam bars 17, 18 may be formed as flanks which guide the table directly, for instance through linkages. For simple applications the pressurized air control can thus be dispensed with.

Figure 6:
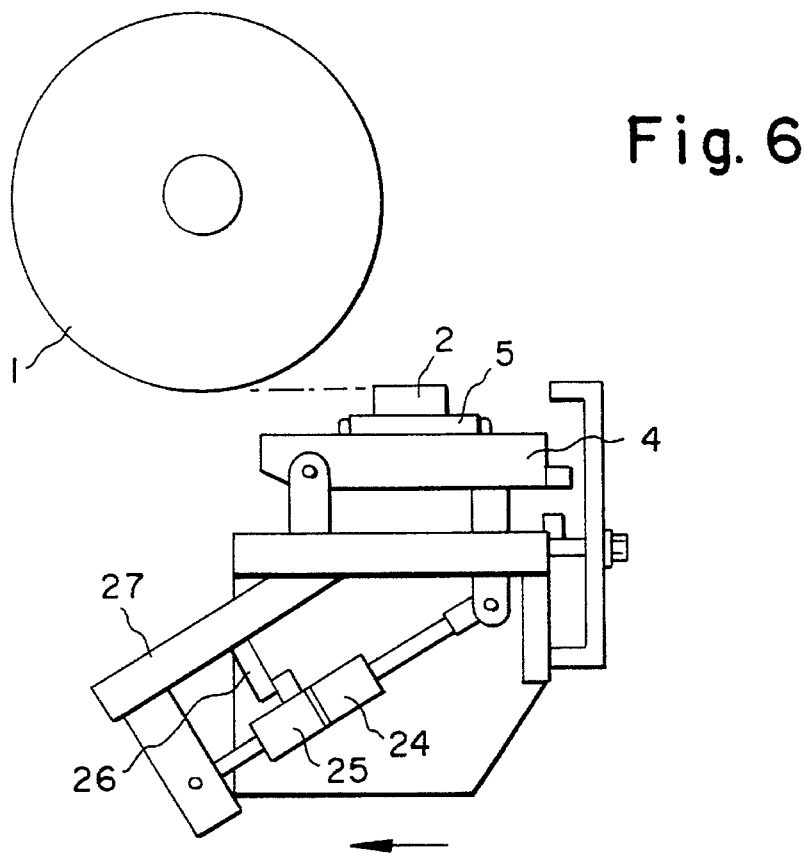
FIG. 6 is a diagrammatic side view of a table lifting mechanism showing the table surface in a horizontal position.
Figure 7:
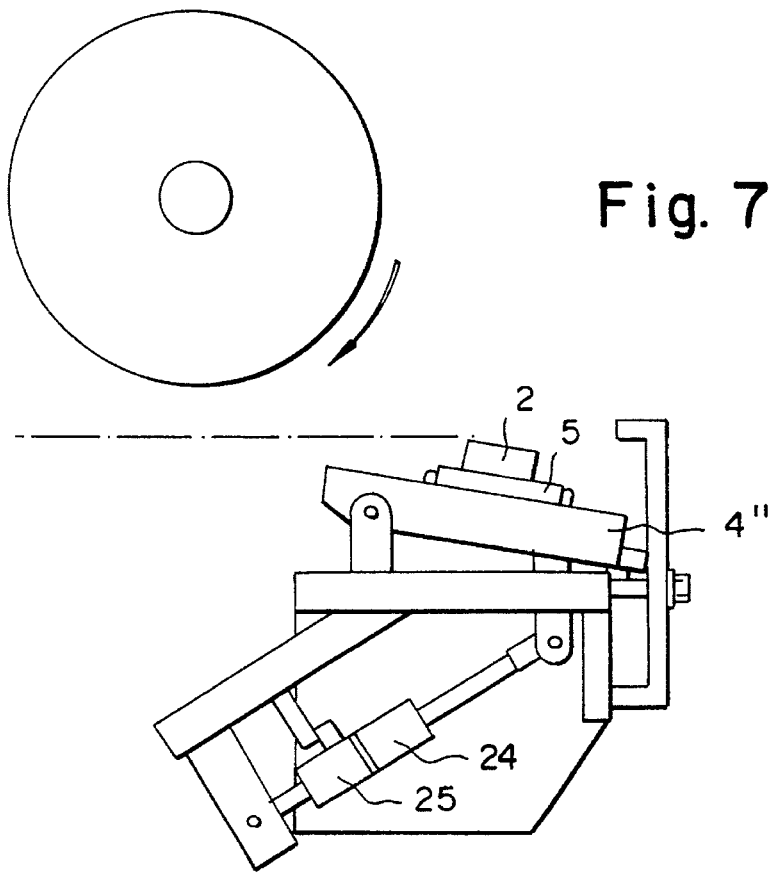
FIG. 7 is a similar view showing the table surface in a lower position.
Figure 8:
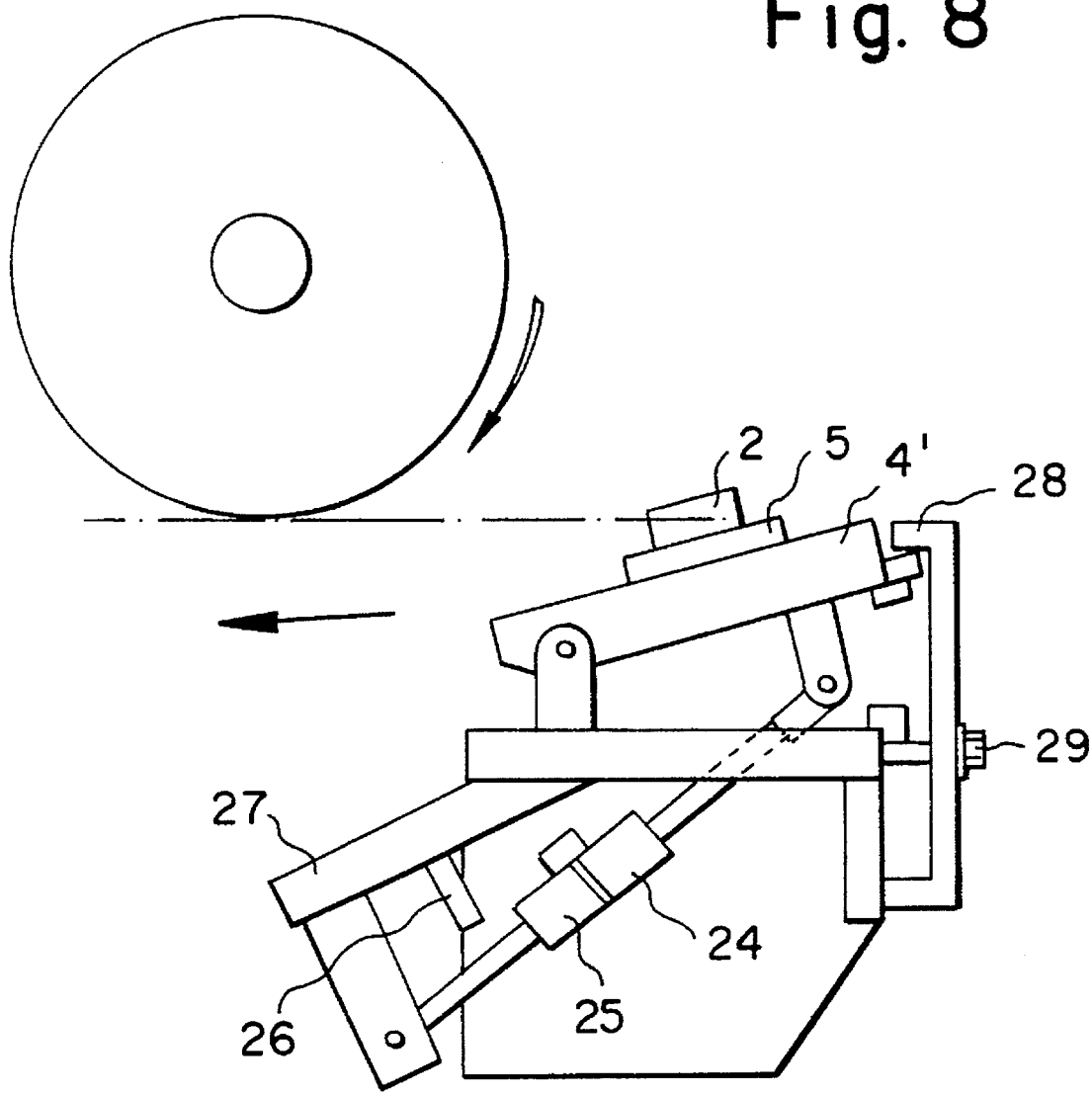
FIG. 8 is a similar view showing the table surface in an upper position.

Referring now to FIGS. 6–8, which illustrate an alternative embodiment of the table carriage and the table surface tilt mechanism, the pneumatic cylinder 16 may be in the form of two piston cylinders 24, 25 disposed back-to-back. The horizontal position shown in FIG. 6 corresponds to the position illustrated in FIG. 1, when the brake pad 2 is first mounted in the mounting assembly 5. The lower cylinder 25 is retracted, while the upper cylinder 24 is extended. A stop 26 is provided at a lower linkage 27 which defines the horizontal position. An adjustable stop 28 is provided at the trailing end of the table surface 4 which defines the raised position 4' of the table surface 4. The stop 28 may be adjusted at a bolt knob 29. FIG. 7 illustrates the lower position 4" of the table surface 4, when both cylinders 24 and 25 are retracted. FIG. 8 illustrates the raised position 4' when both cylinders are extended.

I claim:

1. Apparatus for producing inclined surfaces and/or grooves on automotive friction pads, comprising:
    a carriage table having a table surface for supporting friction pads and being driveable in a given direction along a substantially rectilinear travel path;
    grind disks for grinding inclined surfaces on the friction pads disposed along the travel path and rotatable about an axis extending transversely to the given direction;
    said table surface being swivellable about at least one axis to selectively assume a plurality of operational positions.

2. The apparatus according to claim 1, wherein said table surface is swivellable about an axis extending transversely to the given direction.

3. The apparatus according to claim 1, wherein the friction pads have a given length, said grind disks are trucated conical grind disks and said grind disks are disposed in pairs and mirror-symmetrically relative to said travel path, said pairs of grind disks defining a spacing therebetween in the given direction approximately corresponding to the length of the friction pads.

4. The apparatus according to claim 3, wherein said pairs of grind disks are height-adjustably disposed relative to said carriage table, and said grind disks of said pairs of grind disks being adjustable in a mutual spacing.

5. The apparatus according to claim 1, including further grind disks disposed along said travel path for grinding longitudinal grooves into said friction pads.

6. The apparatus according to claim 1, including adjustable stops disposed on said carriage table limiting a pivot angle of the table surface from a horizontal position upwardly and downwardly.

7. The apparatus according to claim 1, wherein said grind disks are trucated conical grind disks and said grind disks are disposed in first and second pairs mirror-symmetrically relative to the travel path and behind one another along the travel path, said carriage table including a control for lifting said table surface from a horizontal position into an operating position of said first pair of grind disks, and for lowering said table surface from the horizontal position into an operating position of said second grind disk pair.

8. The apparatus according to claim 7, which further comprises stationary cam bars disposed along the travel path of said carriage table and switches disposed on said carriage table and actuatable by said cam bars for triggering, upon actuation of said switches, operational events.

9. The apparatus according to claim 8, wherein said switches are cam switches.

10. The apparatus according to claim 8, wherein said switches are valves and said carriage table includes at least one fluidically actuated lifting cylinder operatively connected with said valves.

11. The apparatus according to claim 10, wherein said fluidically actuated lifting cylinder is an hydraulically actuated lifting cylinder.

12. The apparatus according to claim 10, wherein said fluidically actuated lifting cylinder is a pneumatically actuated lifting cylinder.

13. The apparatus according to claim 11, wherein said table is lockable in defined operational positions defined by stops.

14. The apparatus according to claim 13, wherein the defined operational positions include horizontal, upwardly inclined, and downwardly inclined, relative to the travel direction.

* * * * *